United States Patent
Trapy

Patent Number: 5,844,463
Date of Patent: Dec. 1, 1998

[54] PROCESS AND DEVICE FOR REGULATING THE TEMPERATURE OF A FLUID

[75] Inventor: Jean Trapy, Rueil-Malmaison, France

[73] Assignee: Institute Francais du Petrole, Rueil-Malmaison, France

[21] Appl. No.: 721,450

[22] Filed: Sep. 27, 1996

[30] Foreign Application Priority Data

Oct. 2, 1995 [FR] France .................................. 95 11694

[51] Int. Cl.$^6$ .............................. H01H 37/00; F01P 7/00
[52] U.S. Cl. .................................... 337/2; 337/1; 236/34; 123/41.02
[58] Field of Search .................. 337/1–5, 35; 123/41.01, 123/41.02, 41.08, 41.1; 236/34, 34.5

[56] References Cited

U.S. PATENT DOCUMENTS

| | | |
|---|---|---|
| 2,137,136 | 11/1938 | Giesler . |
| 2,754,062 | 7/1956 | Wangenheim . |
| 4,606,302 | 8/1986 | Huemer et al. ........................ 123/41.1 |
| 4,828,167 | 5/1989 | Kuze . |
| 4,875,737 | 10/1989 | Cook et al. . |

FOREIGN PATENT DOCUMENTS

| | | |
|---|---|---|
| 1523307 | 11/1969 | Denmark . |
| 2668553 | 8/1990 | European Pat. Off. . |
| 653554 | 5/1995 | European Pat. Off. . |
| 1397781 | 5/1964 | France . |
| 383249 | 5/1992 | France . |
| 0256692 | 12/1985 | Japan . |
| 1101617 | 5/1986 | Japan . |
| 977658 | 12/1964 | United Kingdom . |
| 2067723 | 7/1981 | United Kingdom . |

*Primary Examiner*—Leo P. Picard
*Assistant Examiner*—Jayprakash N. Gandhi
*Attorney, Agent, or Firm*—Antonelli, Terry, Stout & Kraus, LLP

[57] ABSTRACT

The present invention relates to a process for regulating the temperature of a fluid circuit comprising a thermostatic valve, which consists in maintaining a leak rate through the valve once the valve has been opened a first time in order to eliminate the temperature fluctuations of the fluid around a regulation temperature. Two thermodilatable elements with different expansion temperature thresholds are used. The invention further relates to a thermostatic valve intended to regulate the temperature of a fluid around at least one value and comprising at least a first thermodilatable element. The valve further includes a second thermodilatable element for maintaining a controlled leak rate as soon as the valve has been opened (a first time).

4 Claims, 2 Drawing Sheets

U.S. Patent     Dec. 1, 1998     Sheet 2 of 2     5,844,463
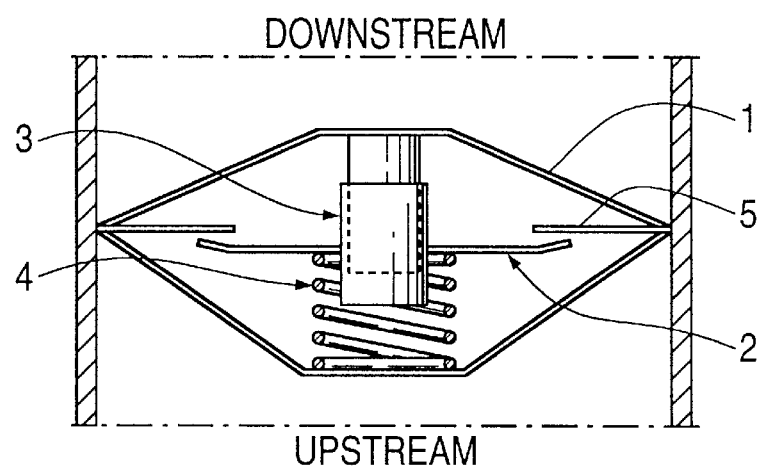
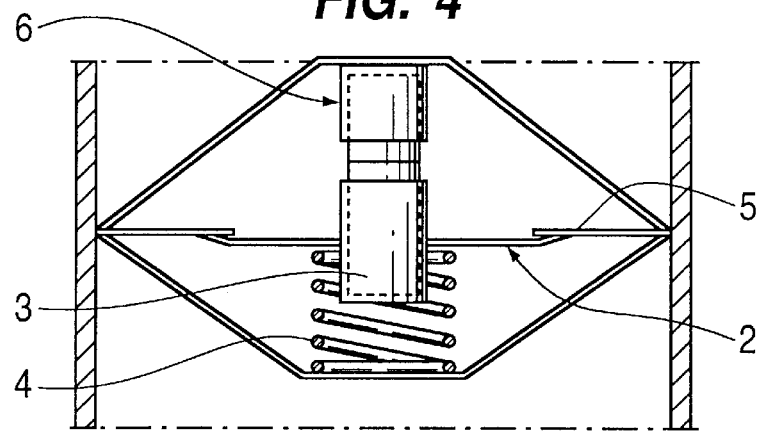
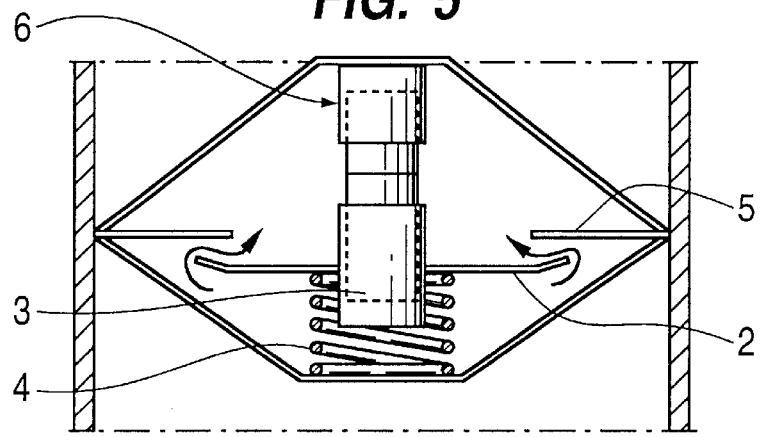

PROCESS AND DEVICE FOR REGULATING THE TEMPERATURE OF A FLUID

FIELD OF THE INVENTION

The present invention relates to the field of thermostatic valves intended to regulate the temperature via the flow of fluid flowing therethrough. The invention also relates to the associated regulation processes.

More precisely, the present invention relates to valves actuated by a first thermosensitive or thermodilatable element such as dilatable wax.

BACKGROUND OF THE INVENTION

Conventionally in such valves, a capsule containing dilatable wax and in contact with the fluid acts on a flap that opens as soon as the temperature of the capsule exceeds a threshold; the flap remains closed below this threshold.

A particularly interesting application of this type of valves relates to the cooling circuits of heat engines. In this case, the thermostats are placed on the cooling circuits of the engines, in a place where they can cold short-circuit the radiator in order to prevent the cooling liquid from flowing through the radiator. This prevents the liquid from being cooled while flowing through the radiator and it therefore contributes to accelerating heating of the engine and of the passenger cell. When the engine is warm, the function of such valves is to maintain the temperature of the liquid within a determined regulation range, for example between 80° and 90° C.

There are thus valves containing thermosensitive elements having a first threshold value corresponding to a small valve opening and a second, higher temperature threshold for full opening. The regulation range lies between these two values.

Many documents have already been published in this field, such as for example patents U.S. Pat. No. 4,875,437, U.S. Pat. No. 4,828,167 or patent applications EP-383,249, EP-653,554, FR-2,668,853.

These documents describe improvements brought to the above-mentioned basic concept.

The present invention notably presents a simple and original solution to the problem of liquid temperature fluctuations around a regulation value.

In practice, these fluctuations are due to a succession of openings and closings of the valve, induced by the non zero response delay time of the thermosensitive element.

Of course, these various fluctuations are not desirable since, in the case of the regulation of engine cooling circuits, they disturb the regulation and subject the circuits to periodic pressure and temperature stresses likely to strain the elements of the circuit.

Solutions to this problem have already been proposed, such as for example multi-threshold or throttling valve thermostats, but these solutions are often more complex and therefore more costly.

The present invention notably allows to overcome the above-mentioned problem in a simple and effective way.

SUMMARY OF THE INVENTION

The object of the present invention is thus a process for regulating the temperature in a fluid circuit comprising a thermostatic valve.

According to the invention, the process consists in maintaining a leak rate through the valve once it has been opened a first time, thanks to a first thermodilatable element, in order to eliminate the temperature fluctuations of said fluid around a regulation temperature.

More precisely, at least two thermodilatable elements with different expansion temperature thresholds are used, the threshold of the element causing the leak being lower than the threshold of said first thermodilatable element.

The invention further relates to a thermostatic valve intended to regulate the temperature of a fluid around at least one value and comprising at least a first thermodilatable element.

According to the invention, the valve also includes means intended to maintain a controlled leak rate after that the valve has been opened a first time, thanks to said first thermodilatable element.

More particularly, the means providing the leak rate includes a second thermodilatable element placed in contact with the fluid when the valve has already been opened a first time, thanks to said first thermodilatable element.

The first and the second thermodilatable elements advantageously consist of dilatable waxes having each a different expansion temperature threshold.

Thus, the expansion temperature threshold of the wax used for the leak rate is less than the expansion temperature threshold of the wax used for the first opening of the valve.

BRIEF DESCRIPTION OF THE DRAWINGS

Other features, advantages and details of the present invention will be clear from reading the description hereafter, given by way of non limitative examples, with reference to the accompanying drawings in which:

FIG. 2 is a simplified diagram of a well-known thermostat, FIG. 4 is a simplified diagram of a thermostatic valve according to the invention, in the closed state, and FIG. 5 is a simplified diagram of a valve according to the invention, in the open state.

DESCRIPTION OF THE INVENTION

Figure 1:
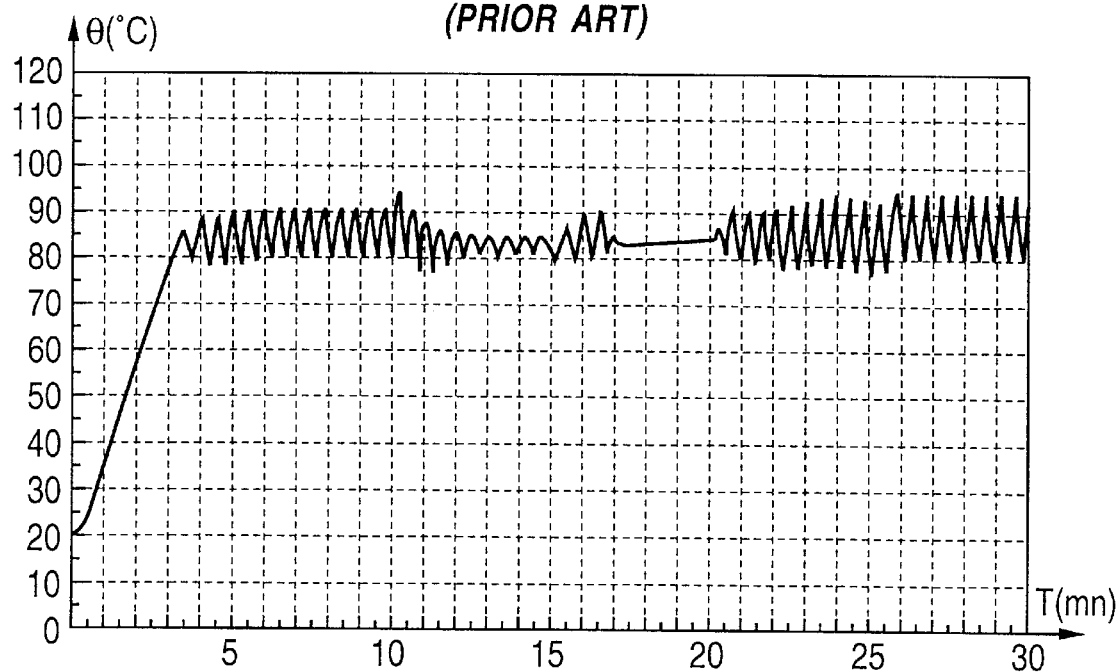
FIG. 1 shows a temperature curve of the liquid, regulated as a function of time according to the prior art.

FIG. 1 thus relates to the operation of a well-known thermostatic valve such as that shown, for example, in FIG. 2. More precisely, the curve of FIG. 1 was obtained by measuring the temperature of the water of a cooling circuit in a heat engine as a function of time. This curve shows a quasi-linear temperature rise, from the ambient temperature (20° C.) up to about 82° C., which is commonly the regulation temperature. This temperature rise is achieved within about 5 mn.

The temperature then fluctuates between 80° and 90° C. throughout the running of the engine. These fluctuations are of course not desirable for the reasons mentioned above.

A thermostatic valve commonly used to obtain the above-mentioned regulation is diagrammatically shown in FIG. 2. The main elements of such a valve are a box 1, a flap 2, a seat 5 for flap 2, a thermodilatable element 3 associated with a return element 4.

The thermodilatable element 3 can be, as it is well-known, a capsule containing a wax that is continously dilatable within a temperature range.

Since element 3 is always in contact with the liquid to be regulated, the wax it contains expands when the temperature of said liquid increases, which has the effect of exerting a thrust against return spring 4 and therefore of driving flap 2 away from its seat 5. This allows passage of the cooling fluid through the valve.

The wax begins to expand from a first given temperature onwards and allows a first elongation of element 3, i.e. a low-amplitude opening of the valve, whereas when the liquid reaches a second temperature (higher than the first), thus corresponding to the maximum expansion threshold of the wax, the valve opens more widely, thus allowing a higher flow rate.

As one may have understood, the working principle of this type of valve is based on a regulation of the flow rate that may be a zero, a low or a maximum flow rate.

In practice, temperature regulation is achieved in a non satisfactory way by means of a series of successive valve openings and closings, hence the fluctuations that can be seen in FIG. 1, with the above-mentioned consequences.

If such valves are used for other applications, in the sanitary field for example, these fluctuations are not acceptable either for the user who wishes to obtain a water with a stable temperature, quickly and in a reliable and reproducible way.

Figure 3:
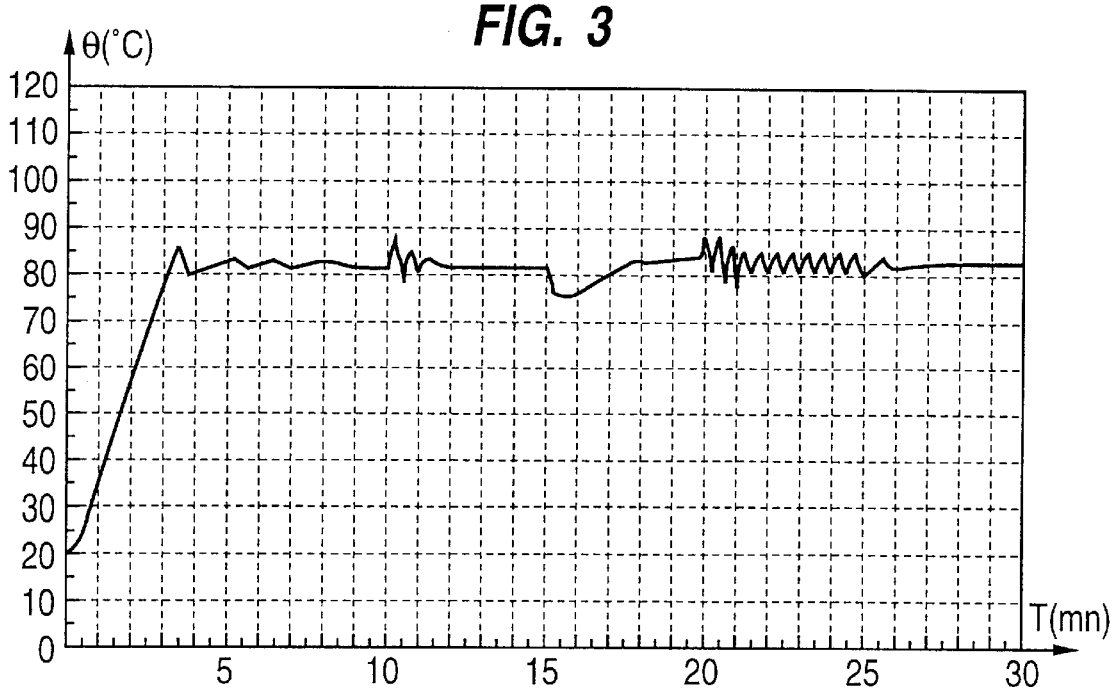
FIG. 3 is a temperature curve of the liquid regulated as a function of time according to the present invention.

FIG. 3 shows a curve obtained according to the present invention. This curve can be compared with that of FIG. 1, the working conditions being the same. A quasi-absence of fluctuations can be seen around the regulation temperature that is here about 83° C.

This characteristic has been obtained by maintaining paradoxaly a leak rate through the valve once the latter has been opened a first time. Unlike what is taught in the prior art, where it is sought for example to obtain a perfect seal below a certain temperature threshold, a leak rate is here allowed immediately after the first opening.

It is important that the leak does not appear before the first opening of the valve, which would be harmful to the temperature rise of the liquid that must be diverted prior to the first opening in order not to flow through the valve.

As explained hereunder, two thermodilatable elements with different expansion thresholds are advantageously used in the valve according to the invention.

FIG. 4 diagrammatically shows an embodiment of the invention. The thermodilatable valve mainly comprises the same elements as that shown in FIG. 2, i.e. a box 1, a flap 2 and a seat 5 for the flap, a first thermodilatable element 3 associated with a return spring 4. The valve according to FIG. 4 also includes a second thermodilatable element 6 situated downstream from the valve, i.e. it is not in contact with the fluid when the valve is closed, as shown in FIG. 4. The first thermodilatable element is thus situated upstream from the valve, whereas the second element is placed downstream therefrom.

Of course, box 1 is here a little higher than in a conventional valve, which is due to the presence of the second thermodilatable element 6 preferably placed in line with element 3.

FIG. 5 shows the valve of FIG. 4 with a leak rate (arrow A) that is obtained by means of the second thermodilatable element 6 placed downstream from the valve, in line with the first thermodilatable element 3, in order to be able to combine its own thrust with the thrust of the first thermodilatable element 3.

Thus, when the temperature of the liquid in which the first thermodilatable element 3 permanently bathes reaches a certain threshold, the latter (3) expands, which allows a first opening of the valve. The second thermodilatable element 6 then also bathes in the liquid. Since its temperature threshold is lower than that of the first thermodilatable element, the second thermodilatable element 6 expands, so that flap 3 can no longer be in contact with its seat 5. This leads thus to a leak rate while maintaining a residual lift in case of a new valve opening.

The leak rate must be sufficient to keep the second thermodilatable element 6 extended, hence the lower expansion temperature threshold than that of the first thermodilatable element 3.

By way of information, the expansion temperature threshold of the second thermodilatable element can be of the order of 50° to 60° C., whereas that of the first thermodilatable element can range between 80° and 90° C.

In case of an application to a cooling circuit of an engine and according to an interesting feature of the invention, once the engine has been stopped, with the general temperature fall, the valve automatically returns to its original state, i.e. closed, as shown in FIG. 4. Each time the engine is started, the valve according to the invention is closed and it opens a first time when the cooling liquid reaches a certain temperature.

The embodiment of the invention envisaged above shows that the two thermodilatable elements 3, 6 act on the same flap 2. Without departing from the scope of the invention, each thermodilatable element may act on a different flap if this seems desirable.

Of course, other means allowing to obtain the leak rate according to the invention may be imagined by the man skilled in the art without departing from the scope of the present invention.

I claim:

1. A thermostatic valve for regulating and reducing fluctuations of the temperature of a fluid around a regulation temperatures comprising:

a housing;

a flap;

a seat for the flap;

a first thermodilatable element provided in said housing at a location always in contact with the fluid and operably connected to the flap for opening the valve by driving the flap away from the seat when the temperature of the fluid exceeds a threshold temperature; and a second thermodilatable element provided in said housing downstream of the flap at a location in contact with the fluid only when the valve is open, said second thermodilatable element being operably connected to the flap for maintaining a controlled leak rate only after the valve has been opened a first time by the first thermodilatable element.

2. A thermostatic valve as claimed in claim 1, wherein the second thermodilatable element has a threshold temperature lower than the threshold temperature of the first thermodilatable element.

3. A thermostatic valve as in claim 1, wherein each of the first and second thermodilatable elements comprises a capsule containing a wax that is continuously dilatable within a temperature range.

4. A thermostatic valve as claimed in claim 3, wherein the second thermodilatable element has a threshold temperature lower than the threshold temperature of the first thermodilatable element.

* * * * *